(12) United States Patent
Oh et al.

(10) Patent No.: US 8,998,304 B2
(45) Date of Patent: Apr. 7, 2015

(54) CAB REAR MOUNTING DEVICE

(71) Applicant: Hyundai Motor Company, Seoul (KR)

(72) Inventors: Seunghyun Oh, Hwaseong-si (KR); Byungbae Kim, Jeonju-si (KR); Dong Geun Lee, Gunpo-si (KR); Dae Su Kim, Jeonju-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/073,690

(22) Filed: Nov. 6, 2013

(65) Prior Publication Data
US 2014/0361566 A1 Dec. 11, 2014

(30) Foreign Application Priority Data
Jun. 7, 2013 (KR) .......................... 10-2013-0065502

(51) Int. Cl.
B62D 33/06 (2006.01)

(52) U.S. Cl.
CPC .................................. *B62D 33/0604* (2013.01)

(58) Field of Classification Search
CPC ............. B62D 33/067; B62D 33/0617; B62D 33/0604
USPC ......................... 296/190.06, 190.07, 190.04
See application file for complete search history.

(56) References Cited

U.S. PATENT DOCUMENTS

| 3,312,303 | A | * | 4/1967 | Milloy ........................ 180/89.14 |
| 3,847,492 | A | * | 11/1974 | Kennicutt et al. ............. 403/224 |
| 3,857,602 | A | * | 12/1974 | Karkau et al. ................ 296/35.3 |
| 5,562,390 | A | * | 10/1996 | Christenson ................... 414/477 |
| 5,975,228 | A | * | 11/1999 | Parfitt ......................... 180/69.21 |
| 7,607,721 | B2 | * | 10/2009 | Grimes et al. ........... 296/190.01 |

FOREIGN PATENT DOCUMENTS

| JP | 2544899 | Y2 | 5/1997 |
| JP | 2553948 | Y2 | 7/1997 |
| JP | 2002-129799 | A | 5/2002 |
| JP | 2009-12509 | A | 1/2009 |
| JP | 2012-180028 | A | 9/2012 |
| KR | 10-2007-0021443 | A | 2/2007 |

* cited by examiner

*Primary Examiner* — Pinel Romain
(74) *Attorney, Agent, or Firm* — Morgan, Lewis & Bockius LLP (57) ABSTRACT

A cab rear mounting device includes: a pair of posts disposed at a predetermined interval in a width direction of a vehicle, and fixedly mounted to a vehicle body; strikers mounted to the pair of posts, respectively; a pair of locking devices mounted to the cab, and coupled to each striker to be locked, so as to fix the cab to the vehicle body, or separated from each striker to be unlocked, so as to release the cab from the vehicle body; and damper devices mounted to the posts, respectively, and configured to absorb vibration or shock, thereby promoting a decrease in the number of components, and weight and cost of the vehicle.

16 Claims, 6 Drawing Sheets

CAB REAR MOUNTING DEVICE

CROSS-REFERENCE TO RELATED APPLICATION

The present application claims priority of Korean Patent Application Number 10-2013-0065502 filed Jun. 7, 2013, the entire contents of which application is incorporated herein for all purposes by this reference.

BACKGROUND OF INVENTION

1. Field of Invention

The present invention relates to a cab rear mounting device, which detachably mounts a rear side of a cab of a common vehicle, such as a truck, to a vehicle body.

2. Description of Related Art

In general, a cab mounted onto a large truck, such as a vehicle with cargo, is mounted so as to be tilted at a predetermined angle in a front direction of a vehicle, such that a device, such as an engine or a transmission, which is installed at a lower portion of the cab, can be repaired and checked.

A cab mounting device in the related art includes a front hinge device rotatably mounting a front side of the cab to a vehicle body, and a rear mounting device detachably mounting a rear side of the cab to the vehicle body, and the rear side of the cab is separated from the vehicle body through the rear mounting device, and then the cab is tilted at a predetermined angle in a front direction of the vehicle through the front hinge device.

Further, the cab mounting device in the related art appropriately absorbs vibration or shock of the vehicle generated due to an uneven road surface while the vehicle travels, so as to prevent the vibration or the shock from being transmitted to the cab as far as possible, thereby serving to decrease driving fatigue of a driver or a passenger riding in the cab.

The rear mounting device in the cab mounting device in the related art includes a type using a rigid rubber, a type using a cushion oil rubber, a type using a coil spring and a shock absorber, or a type using an air spring and a shock absorber.

However, the rear mounting device of the cab in the related art, which detachably mounts the rear side of the cab to the vehicle has a complex shape and structure, and uses a rubber mounted in a height direction of the vehicle, so that there is a drawback in that mounting workability and ride comfort are poor, and weight of the vehicle is increased.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for a cab rear mounting device, which has a simple structure, thereby promoting a decrease in weight and cost of a vehicle, improving mounting workability, and improving rid comfort.

Various aspects of the present invention provide for a cab rear mounting device including: a pair of posts disposed at a predetermined interval in a width direction of a vehicle, and fixedly mounted to a vehicle body; strikers mounted to the pair of posts, respectively; a pair of locking devices mounted to the cab, and coupled to each striker to be locked, so as to fix the cab to the vehicle body, or separated from each striker to be unlocked, so as to release the cab from the vehicle body; and damper devices mounted to the posts, respectively, and configured to absorb vibration or shock.

The vehicle body may include one or more vehicle body frames disposed at a predetermined interval in a width direction of the vehicle, and the posts may be fixedly mounted to the one or more vehicle body frames, respectively.

The cab rear mounting device may further include an operation bar connected with the pair of locking devices and configured to simultaneously lock or unlock the pair of locking devices.

An operation handle may be provided at a front end portion of the operation bar, and a key set, which is operable only by a starting key of the vehicle in order to restrict an operation of the operation handle, may be installed at a portion adjacent to the operation handle.

The pair of posts may be provided with hooks shaped like a letter "⊏" protruding in a vertical direction, respectively, and the cab may be provided with a safety hook detachably coupled to the hook.

A mounting bracket may be fixedly mounted to a rear lower portion of the cab, and the safety hook and the locking device may be mounted to the mounting bracket.

The damper device may be disposed and mounted at front and rear sides of each of the pair of posts in a longitudinal direction of the vehicle, and include a pair of bushes integrally connected by the striker.

Each of the pair of posts may include a post body approximately shaped like a bracket having a length relatively larger than a width, a pair of extended portions formed at upper portions of the post bodies in a height direction of the post body while being widened to both left and right sides, and a pair of mounting parts shaped like a cylinder, integrally formed at the pair of extended portions, and having both opened side surfaces, and the pair of bushes may be inserted into and mounted at the pair of mounting parts, respectively.

The damper device may further include a shock absorber mounted to the post to be connected with the striker.

A pair of connection parts may be installed while being fitted to external circumferences of the striker, a mounting flange may be inserted into a lower portion of the post body in a height direction of the post body to be integrally fixed and attached to the post body, a mounting bolt may be fastened while passing through the mounting flange, a lower portion of the shock absorber is mounted through the mounting bolt, a link bracket shaped like a letter "V" may be fixedly attached to the pair of connection parts, and an upper portion of the shock absorber may be fastened to the link bracket.

The locking device may include a latch housing mounted to the mounting bracket of the cab, a first latch accommodated inside the latch housing, and rotatably installed so as to be coupled to or separated from the striker, and a second latch rotatably installed inside the latch housing so as to be coupled to or separated from the first latch, and connected with the operation bar so as to interwork with the operation bar.

According to the cab rear mounting device according to the exemplary embodiment of the present invention, it is possible to improve ride comfort and a degree of tuning freedom by decreasing mounting stiffness by the pair of bushes disposed in the longitudinal direction of the vehicle, and it is possible to selectively adjust cost and ride comfort of the rear mounting device because the shock absorber is detachable.

Further, it is possible to simplify a shape of the rear lower portion of the cab, and to simplify a structure of the mounting part of the locking device, which selectively locks the rear side of the cab to the vehicle body, thereby promoting a decrease in a molding operation and workability improvement.

Further, it is possible to promote a decrease in weight and cost of the vehicle by simplifying the structure by using the separable posts separated and disposed at both left and right sides in the width direction of the vehicle.

Further, since a structure of the locking device, which detachably locks the rear side of the cab to the vehicle body, is simple, it is possible to improve workability, and it is possible to improve operating reliability due to uniform locking tension.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
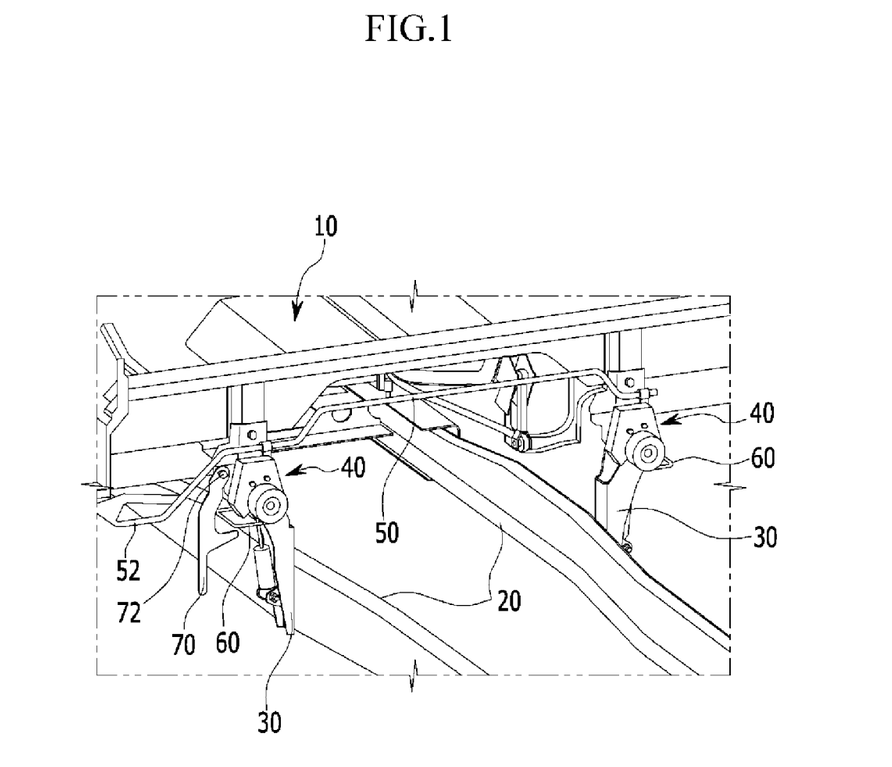
FIG. 1 is a perspective view illustrating a state in which an exemplary cab rear mounting device according to the present invention is mounted to a rear lower portion of a cab.
Figure 2:
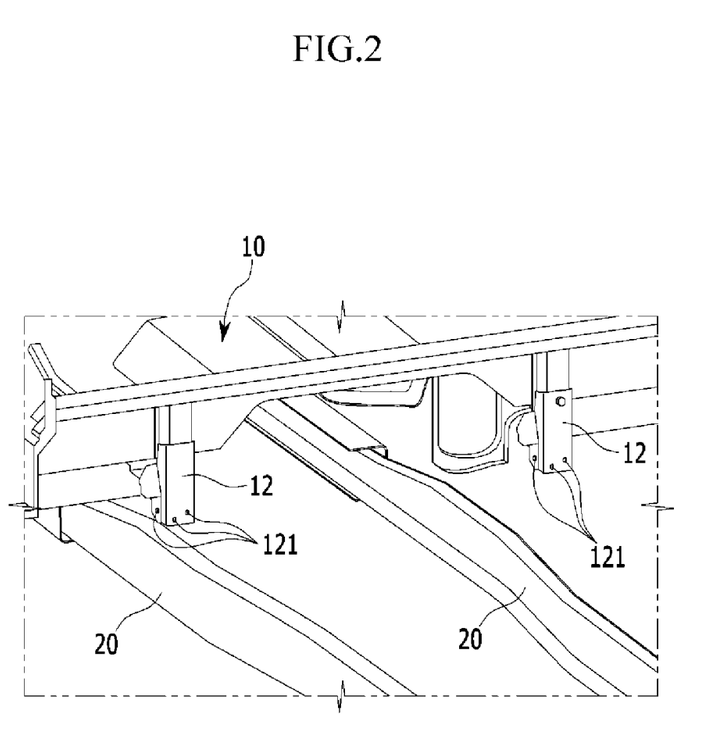
FIG. 2 is a perspective view of the lower portion of the rear side of the cab to which the exemplary cab rear mounting device according to the present invention is mounted.

Referring to FIGS. 1 and 2, a cab rear mounting device according to various embodiments of the present invention may detachably mount a rear side of a cab 10 including a riding space with a predetermined size, in which a driver, and the like, may get, to a vehicle body.

That is, the cab 10 may be detachably mounted to a pair of vehicle body frames 20 configuring a vehicle body, formed to be extended in a longitudinal direction of the vehicle, and disposed at a predetermined interval in a width direction of the vehicle.

The cab rear mounting device may include a pair of separable posts 30 fixedly mounted to be perpendicular to the pair of vehicle body frames 20, and formed to be extended in a height direction of the vehicle.

When one pair of separable posts is used as described above, it is possible to simplify a structure of the rear mounting device, and decrease weight and cost of the rear mounting device.

One pair of locking devices 40 fastened to the pair of posts 30 to fix the cab 10 to the pair of vehicle body frames 20, or separated from the pair of posts 30 to detach the cab 10 from the vehicle body frames 20 may be mounted on the cab 10.

An operation bar 50, which is connected with the pair of locking devices 40 to simultaneously lock or unlock the pair of locking devices 40, may be provided.

The operation bar 50 is formed to be extended in the width direction of the vehicle, and may have one front end connected with one locking device 40, and have the other front end provided with an operation knob 52 enabling an operator to easily grip and operate the operation bar 50.

Each of the pair of posts 30 is provided with a hook 60 approximately shaped like a letter "⌐" protruding in a vertical direction, and a rear lower portion of the cab 10 is provided with a safety hook 70 detachably coupled to the hook 60.

A mounting bracket 12 is fixedly mounted at the rear lower portion of the cab 10, the mounting bracket 12 is provided with a plurality of fastening holes 121, and the safety hook 70 may be rotatably mounted in the fastening holes 121 through a hinge pin 72.

Only the mounting bracket 12 for mounting the locking device 40 is simply mounted at the rear lower portion of the cab 10, so that it is possible to simplify a shape of the cab 10 as compared to the related art, and thus it is possible to decrease a mold work process, and improve productivity.

Figure 3:
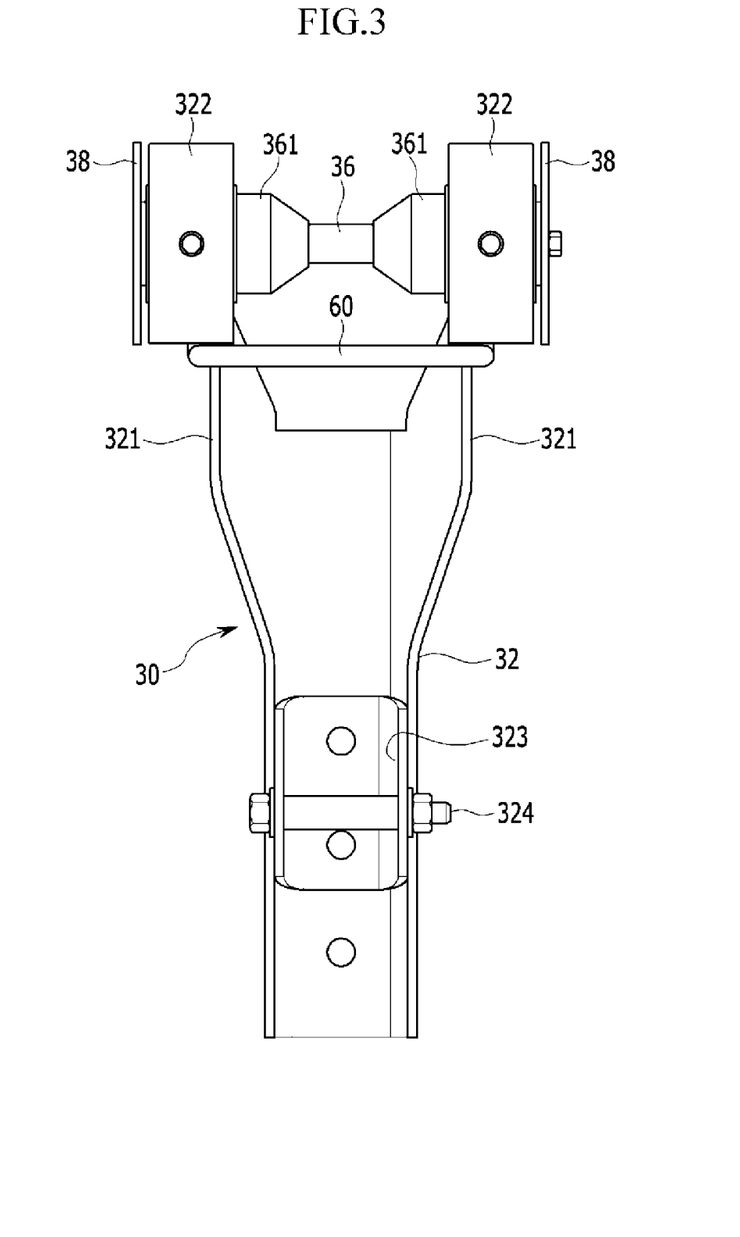
FIG. 3 is a front view of an exemplary post according to the present invention.

Referring to FIG. 3, each of the pair of posts 30 may include a post body 32 shaped like an approximate bracket having a relatively larger length than a width.

A pair of extended portions 321 widened in left and right directions may be integrally formed at upper portions of the post bodies 32 in a height direction thereof, and a pair of mounting parts 322 having opened both sides and having a cylindrical shape may be integrally formed at the pair of extended portions 321.

A pair of bushes 34 approximately shaped like a cylinder and formed of rubber may be inserted into and mounted at the pair of mounting parts 322, respectively. (See FIG. 4)

The pair of bushes 34 may form a damper device, and may be connected with each other through a striker 36 fastened while passing through centers thereof.

A stopper plate 38 may be installed at the pair of mounting parts 322 in order to prevent the pair of bushes 34 inserted into the pair of mounting parts 322 from being separated from the mounting parts 322.

A pair of connection parts 361 may be installed at external circumferences of the striker 36 while being fitted to the external circumferences of the striker 36.

The pair of connection parts 361 may be disposed to be spaced apart from each other in an axis direction of the striker 36.

A mounting flange 323 may be inserted into a lower portion in a height direction of the post body 32 to be integrally and fixedly attached to the post body 32.

A mounting bolt 324 may be fastened while passing through the mounting flange 323.

The pair of bushes 34 is disposed at the pair of posts 30 while being spaced apart from each other in a longitudinal direction of the vehicle by the pair of mounting parts 322.

Each of the pair of bushes 34 is accurately operated in three axes directions of the longitudinal direction, the height direction, and the width direction of the vehicle, stiffness thereof is easily adjusted, and each of the pair of bushes 34 is independently operated, thereby improving ride comfort.

Figure 4:
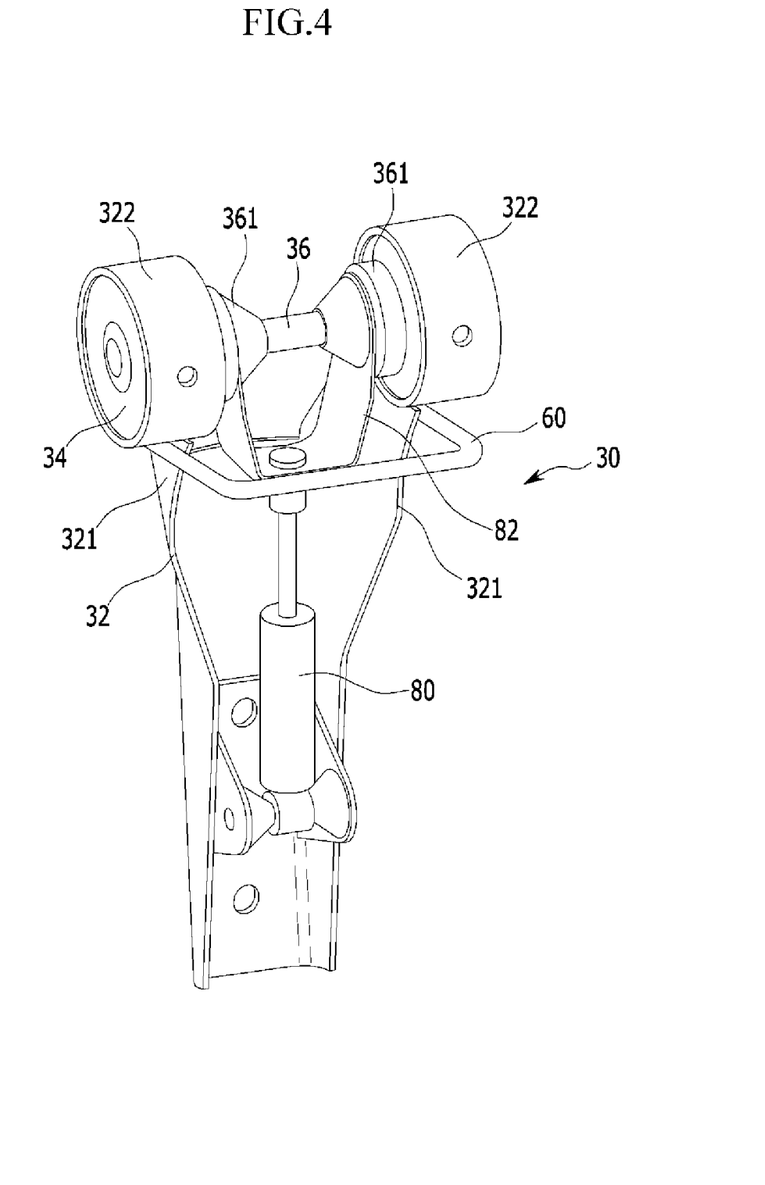
FIG. 4 is a perspective view of an exemplary post according to the present invention.
Figure 5:
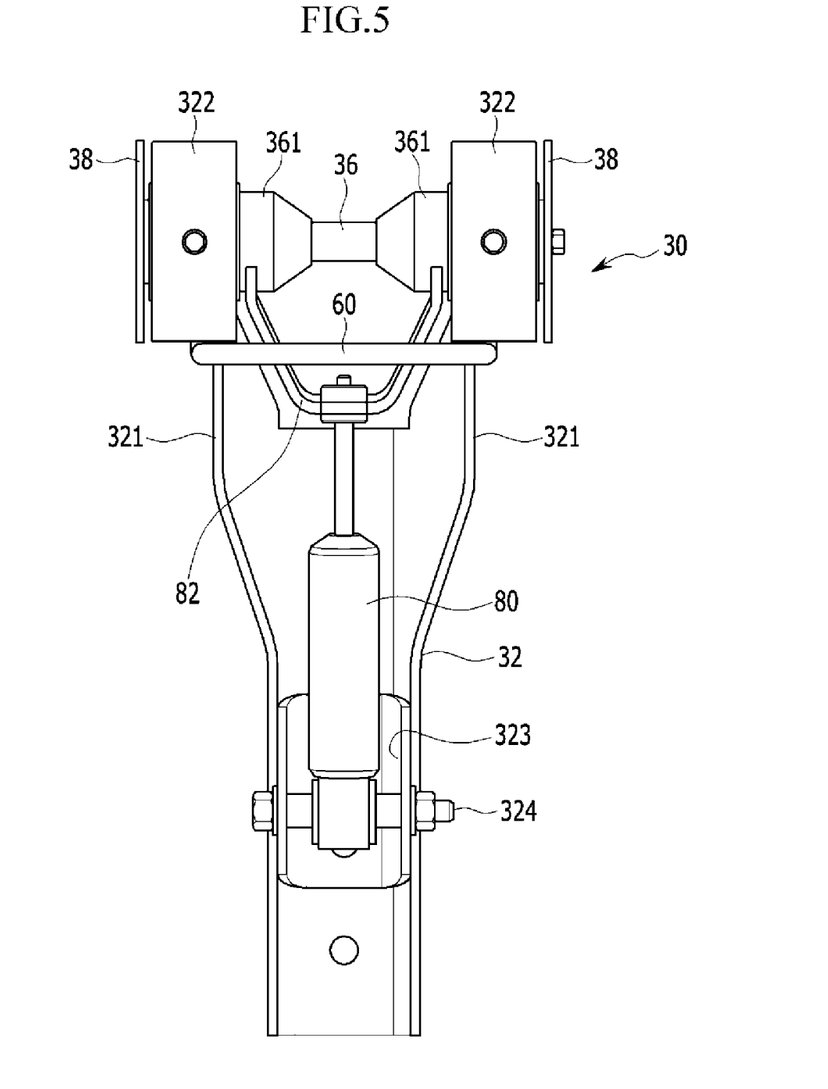
FIG. 5 is a front view of an exemplary post according to the present invention.

FIGS. 4 and 5 illustrate the post according to another exemplary embodiment, and a lower portion of a shock absorber 80 is fastened to and supported by the mounting bolt 324, and an upper portion of the shock absorber 80 is connected with the pair of connection parts 361 through a link bracket 82 approximately shaped like a letter "V".

That is, an upper end of the shock absorber 80 is fastened to the lower portion of the link bracket 82 while passing through the lower portion of the link bracket 82, and both upper portions of the link bracket 82 may be integrally connected to the pair of connection parts 361 by a method, such as welding.

The shock absorber 80 forms the damper device together with the pair of bushes 34.

When the shock absorber 80 is mounted to the post 30 as described above, the shock absorber 80 absorbs and decreases vibration and shock, thereby further improving ride comfort.

Further, the shock absorber 80 may be optionally mounted to the post 30 according to various embodiments as shown in FIG. 3, so that it is possible to dualize a price of the cab rear mounting device.

Figure 6:
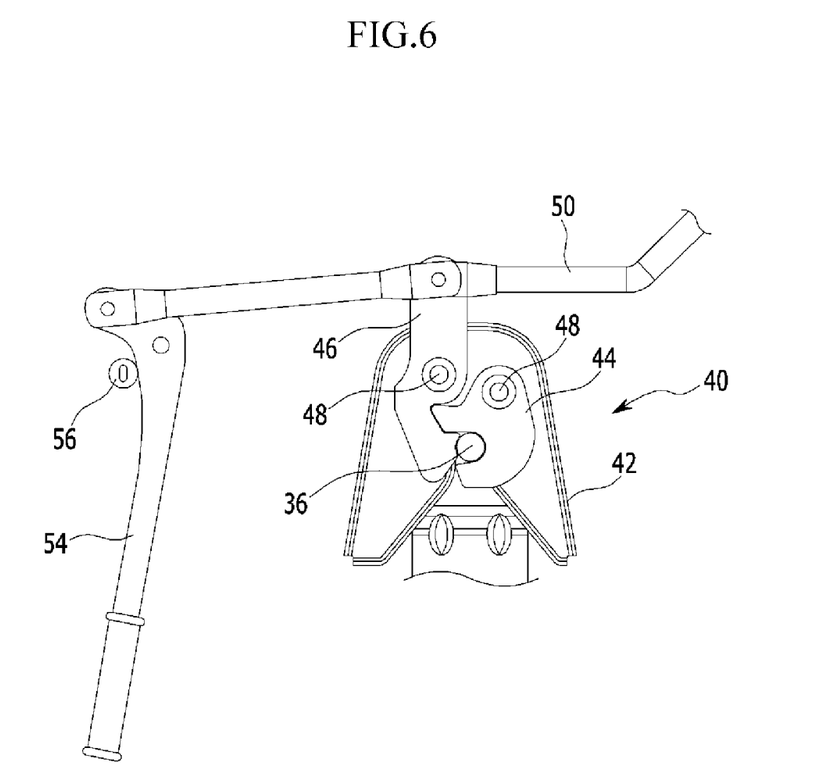
FIG. 6 is a front view of an exemplary locking device including an exemplary latch according to the present invention.

Referring to FIG. 6, the locking device 40 may include a latch housing 42 fastened and mounted to the mounting bracket 12 of the cab 10 through the plurality of fastening holes 121, a first latch 44 accommodate inside the latch housing 42 and rotatably installed so as to be coupled to or separated from the striker 36, and a second latch 46 rotatably installed inside the latch housing 42 so as to be coupled to or separated from the first latch 44, and connected with the operation bar 50 so as to interwork with the operation bar 50.

Each of the first latch 44 and the second latch 46 may be fastened to the latch housing 42 through a pin 48 to be rotatably supported.

When the cab 10 moves down toward the vehicle body, the first latch 44 of the locking device 40 mounted to the cab 10 is coupled to and caught by the striker 36 of the post 30 installed at the vehicle body frame 20, and in this state, when the second latch 46 is coupled to the first latch 44 by operating the operation bar 50, the cab 10 may be detachably coupled to and supported by the vehicle body frame 20 through the locking device 40 by means of the post 30.

The aforementioned locking device 40 has a simple structure, so that it is possible to improve workability, simplify even a structure of a cab mounting portion, and promote uniform locking tension.

An operation handle 54 is connected to one front end portion of the operation bar 50, and a key set 56 is installed at a portion adjacent to the operation handle 54, so that only a person possessing a starting key of the vehicle is allowed to operate the operation handle 54, thereby enhancing stability of a tilting operation of the cab.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

For convenience in explanation and accurate definition in the appended claims, the terms upper or lower, front or rear, left or right, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A cab rear mounting device, comprising:
a pair of posts disposed at a predetermined interval in a width direction of a vehicle and fixedly mounted to a vehicle body;
strikers mounted to the pair of posts, respectively;
a pair of locking devices mounted to a cab, and coupled to each striker to be locked to affix the cab to the vehicle body, or separated from each striker to be unlocked to release the cab from the vehicle body;
damper devices mounted to the posts, respectively, and configured to absorb vibration or shock;
an operation bar connected with the pair of locking devices and configured to simultaneously lock or unlock the pair of locking devices,
wherein an operation handle is provided at a front end portion of the operation bar; and
a key set, which is operable only by a starting key of the vehicle in order to restrict an operation of the operation handle, is installed at a region adjacent to the operation handle.

2. The cab rear mounting device of claim 1, wherein:
the vehicle body includes one or more vehicle body frames disposed at a predetermined interval in a width direction of the vehicle, and
the posts are fixedly mounted to the one or more vehicle body frames, respectively.

3. The cab rear mounting device of claim 1, wherein:
the pair of posts is provided with hooks shaped like a letter "⊏" protruding in a vertical direction, respectively, and
the cab is provided with a safety hook detachably coupled to the hook.

4. The cab rear mounting device of claim 3, wherein:
a mounting bracket is fixedly mounted to a rear lower portion of the cab, and the safety hook and the locking device are mounted to the mounting bracket.

5. The cab rear mounting device of claim 1, wherein:
each damper device is disposed and mounted at front and rear sides of each of the pair of posts in a longitudinal direction of the vehicle, and includes a pair of bushes integrally connected by the striker.

6. The cab rear mounting device of claim 5, wherein:
each of the pair of posts includes:
a post body approximately shaped like a bracket having a length relatively larger than a width;
a pair of extended portions formed at upper portions of the post bodies in a height direction of the post body while being widened to both left and right sides; and
a pair of mounting parts shaped like a cylinder, integrally formed at the pair of extended portions, and having both opened side surfaces, and
the pair of bushes is inserted into and mounted at the pair of mounting parts, respectively.

7. The cab rear mounting device of claim 5, wherein:
the damper device further includes a shock absorber mounted to the post to be connected with a striker.

8. The cab rear mounting device of claim 7, wherein:
a pair of connection parts is installed while being fitted to external circumferences of the striker;

a mounting flange is inserted into a lower portion of the post body in a height direction of the post body to be integrally fixed and attached to the post body;
a mounting bolt is fastened while passing through the mounting flange;
a lower portion of the shock absorber is mounted through the mounting bolt;
a link bracket shaped like a letter "V" is fixedly attached to the pair of connection parts; and
an upper portion of the shock absorber is fastened to the link bracket.

9. The cab rear mounting device of claim 4, wherein:
the locking device includes:
a latch housing mounted to the mounting bracket of the cab;
a first latch accommodated inside the latch housing, and rotatably installed to be selectively coupled to or separated from the striker; and
a second latch rotatably installed inside the latch housing to be selectively coupled to or separated from the first latch, and connected with the operation bar so as to interwork with the operation bar.

10. A cab rear mounting device, comprising:
a pair of posts disposed at a predetermined interval in a width direction of a vehicle and fixedly mounted to a vehicle body;
strikers mounted to the pair of posts, respectively;
a pair of locking devices mounted to a cab, and coupled to each striker to be locked to affix the cab to the vehicle body, or separated from each striker to be unlocked to release the cab from the vehicle body; and
damper devices mounted to the posts, respectively, and configured to absorb vibration or shock,
wherein each damper device is disposed and mounted at front and rear sides of each of the pair of posts in a longitudinal direction of the vehicle, and includes a pair of bushes integrally connected by the striker.

11. The cab rear mounting device of claim 10, wherein each of the pair of posts includes:
a post body approximately shaped like a bracket having a length relatively larger than a width;
a pair of extended portions formed at upper portions of the post bodies in a height direction of the post body while being widened to both left and right sides; and
a pair of mounting parts shaped like a cylinder, integrally formed at the pair of extended portions, and having both opened side surfaces, and
the pair of bushes is inserted into and mounted at the pair of mounting parts, respectively.

12. The cab rear mounting device of claim 10, wherein the damper device further includes a shock absorber mounted to the post to be connected with a striker.

13. The cab rear mounting device of claim 12, wherein:
a pair of connection parts is installed while being fitted to external circumferences of the striker;
a mounting flange is inserted into a lower portion of the post body in a height direction of the post body to be integrally fixed and attached to the post body;
a mounting bolt is fastened while passing through the mounting flange;
a lower portion of the shock absorber is mounted through the mounting bolt;
a link bracket shaped like a letter "V" is fixedly attached to the pair of connection parts; and
an upper portion of the shock absorber is fastened to the link bracket.

14. A cab rear mounting device, comprising:
a pair of posts disposed at a predetermined interval in a width direction of a vehicle and fixedly mounted to a vehicle body;
strikers mounted to the pair of posts, respectively;
a pair of locking devices mounted to a cab, and coupled to each striker to be locked to affix the cab to the vehicle body, or separated from each striker to be unlocked to release the cab from the vehicle body;
damper devices mounted to the posts, respectively, and configured to absorb vibration or shock; and
an operation bar connected with the pair of locking devices and configured to simultaneously lock or unlock the pair of locking devices,
wherein the pair of posts is provided with hooks shaped like a letter "⊏" protruding in a vertical direction, respectively, and the cab is provided with a safety hook detachably coupled to the hook.

15. The cab rear mounting device of claim 14, wherein:
a mounting bracket is fixedly mounted to a rear lower portion of the cab, and the safety hook and the locking device are mounted to the mounting bracket.

16. The cab rear mounting device of claim 15, wherein:
the locking device includes:
a latch housing mounted to the mounting bracket of the cab;
a first latch accommodated inside the latch housing, and rotatably installed to be selectively coupled to or separated from the striker; and
a second latch rotatably installed inside the latch housing to be selectively coupled to or separated from the first latch, and connected with the operation bar so as to interwork with the operation bar.

* * * * *